(12) United States Patent
Shah (10) Patent No.: US 6,227,325 B1
(45) Date of Patent: May 8, 2001

(54) SAFETY EXTERNAL AIR BAG SYSTEM FOR A VARIETY OF CONVEYANCES

(76) Inventor: Reza H. Shah, 21 Park Avenue, Acton, Ontario (CA), L7J 1Y3

( * ) Notice: Subject to any disclaimer, the term of this patent is extended or adjusted under 35 U.S.C. 154(b) by 0 days.

(21) Appl. No.: 09/588,679

(22) Filed: Jun. 7, 2000

(51) Int. Cl.$^7$ .................................................. B60K 28/10
(52) U.S. Cl. ........................................ 180/274; 280/728.1
(58) Field of Search .................................. 180/271, 274; 280/728.1

(56) References Cited

U.S. PATENT DOCUMENTS

| | | | |
|---|---|---|---|
| 3,708,194 | * | 1/1973 | Amit ..................................... 180/274 |
| 3,822,076 | * | 7/1974 | Mercier et al. ....................... 180/274 |
| 5,732,785 | * | 3/1998 | Ran et al. ............................. 180/274 |

* cited by examiner

*Primary Examiner*—Kenneth R. Rice
(74) *Attorney, Agent, or Firm*—David W. Wong (57) ABSTRACT

External inflatable safety bags are provided in this system which is adaptable for a variety of conveyances. A sensing means determines the speed and distance between the conveyance and an obstacle or another conveyance for selectively providing a warning signal to the driver to avoid a collision or to deploy the safety bags automatically when collision is imminent. The safety bags provide impact absorption as well as aerodynamic breaking of the speed of the conveyance.

20 Claims, 8 Drawing Sheets

SAFETY EXTERNAL AIR BAG SYSTEM FOR A VARIETY OF CONVEYANCES

BACKGROUND OF THE INVENTION

This invention relates to a method and system for protecting the passengers and the conveyance in a collision or crash, and more particularly it relates to an external air bags system which may be deployed automatically or manually for saving the lives of the passengers in an accident.

Safety air bags are provided in automobiles, which would deploy within the cabin of the automobile in an accident for preventing injury to the passengers. Commonly, the safety air bags are installed at the steering wheel and/or the dash board, and they would be activated automatically in the accident to provide an impact cushion for the passengers in the front seats in the automobile. There are serious problems associated with the use of such safety air bags. The most severe problem is the tremendous force upon their deployment that they exert on the body and particularly the head of the passengers. Such force per se may cause fatal injury to the passengers, especially for passengers having a small stature or for children. Furthermore, such frontal air bags provide no protection to the passengers in the event of a side collision.

Furthermore, the body front structure of modern automobiles is designed to collapse under the impact force in a head on accident so as to allow some distance of deceleration for reducing the impact to the passengers. However, such measure for softening the impact has only a meager effect in many cases where heavy metal objects like the engine of the automobile is pushed backwards towards the occupants, the result is often deadly. Even when there is no injury to the occupants, the cost for repairing the damage to the automobile is very high and it is ever increasing. Also, additional costs are incurred when police and the ambulance are required to attend to the accident, and when hospitalization is required for the injured. For the above reasons, the automobile insurance cost is extremely high.

It is impractical to provide individual safety bags for all the passengers in a multipassengers conveyance, such as a train or bus, since the cost of installing an air bag for every seat in such vehicle is prohibitive and impractical.

In the crash of a public aircraft, there is always a considerable amount of injury or fatality suffered by a large number of passengers. The injury and fatality are caused by the enormous force the aircraft striking the ground or water, which completely destroys its structure. Similarly, boats, hovercraft and submarines may also involved in a crash with for example other boats, submarines, or with the dock or obstacles under the water.

Attempts have been made to provide external air bags on aircrafts to lessen the impact force with the ground in an accident. U.S. Pat. No. 5,259,574 to L. Carrot and U.S. Pat. No. 5,992,794 to I. Rotman et al show the provision of such external inflatable air bags at the underside of a helicopter. Also, in U.S. Pat. No. 5,765,778 to A. Otsuka, a plurality of external inflatable air bags are provided at the underside of an airplane for the same purposes. However, the air bags therein do not provide any deceleration of the descending speed of the aircraft. They merely provide cushioning of the impact at the end of the fall of the aircraft when it strikes the ground. Moreover, there is no protection provided to the front end of the aircraft, which usually sustains the heaviest damage in a frontal crash.

Also, in U.S. Pat. Nos. 5,646,613 and 5,959,552 both to Cho, U.S. Pat. No. 3,822,076 to Mercier et al, U.S. Pat. No. 5,725,265 to Baber, and U.S. Pat. No. 3,708,194 to Amit, external inflatable air bags are provided for an automobile to cushion the impact force in an accident. However, none the air bags shown in these patents provides a deceleration means to reduce the speed of the vehicle or any means which can capture an approaching vehicle in a head on crash situation. Also, none of these patents shows a safe and effective method of detecting the speed of an approaching object. The laser, maser, or radar system for such detection shown in these patents could cause injury to the eyes of a person when such detecting light beam is reflected from a polished surface such as the bumper of a vehicle.

For boats, hovercrafts, submarines and other water crafts normally a reverse thrust is used by reversing the rotation of the propellers to brake their forward movement. However, the braking action is slow due to the inertia of the craft in the forward direction. In order to avoid collision in an accident, an effective means must be provided to terminate their forward movement promptly and instantly.

SUMMARY OF THE INVENTION

It is a prime object of the present invention to provide an external safety inflatable air bags system which upon its activation provides an aerodynamic braking to reduce greatly the forward speed of a conveyance and also to provide a cushion to absorb the impact force in the collision.

It is another object of the present invention to provide an effective detection means for determining the approaching speed of another conveyance or object in a potential collision so as to produce a warning signal or signals to the operator of the conveyance to invoke an evasive action or to actuate the safety external inflatable air bags system at a predetermined time to save the lives of the occupants as well as the prevent detrimental destruction of the conveyance.

It is another object of the present invention to provide a control system which automatically activates the safety external inflatable air bags system when the other conveyance or object is approaching in a very high speed beyond the allowable time to issue a warning signal to the operator.

It is another object of the present invention to provide a safety external inflatable air bags system which greatly minimizes the damage to a conveyance in a collision.

It is yet another object of the present invention to provide a safety external inflatable air bags system which provides a floatation means for a conveyance when it crashes in water.

BRIEF DESCRIPTION OF THE DRAWINGS

Other objects and advantages of the present invention will become apparent from the following description of the preferred embodiments thereof in connection with the accompanying drawings in which.

DETAILED DESCRIPTION OF THE PREFERRED EMBODIMENTS

Figure 1:
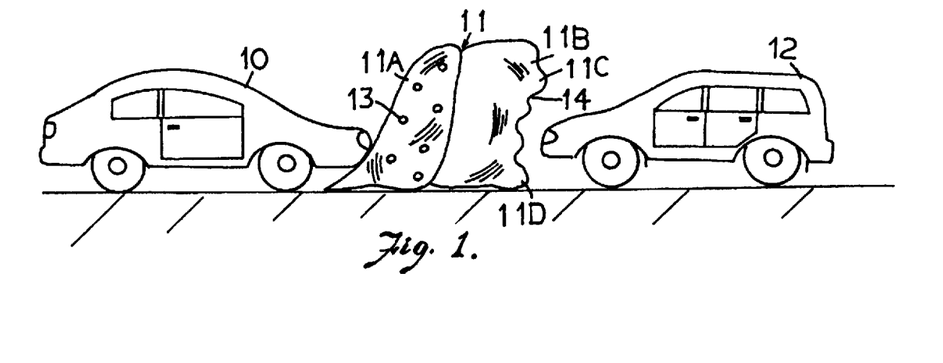
FIG. 1 is a schematic side elevation view showing the provision of a safety inflatable external air bags at the front of an automobile according to the present invention.

With reference to the drawings, an automobile 10 is provided with an inflatable external air bag 11 which has a relatively large size after in has been inflated in an accident so as to provide a cushion means to absorb the impact force of the automobile 10 with an oncoming automobile 12. The front of the air bag 11, depending on the speed of its expansion, forms an effective resistive wall to the air in front to provide an additional aerodynamic breaking for the automobile 10 to slow down its forward motion. The size of the air bag 11 is almost equal to the size of the vehicle 10, and it has a rear compartment 1A and a front compartment 11B. The large size of the air bag 11 also provides a greater aerodynamic drag on the automobile 10. The top front portion 11C of the front compartment 11B projects forward and is intended to capture the oncoming automobile 12, and its bottom portion 11D also extends outwardly forward and is intended to slide under the front of the oncoming automobile 12 to lift the latter off the ground. A plurality of openings 13 having similar or various different sizes are formed in the rear compartment 11A in order to maintain the pressure of the bag 11 at a selected level such that the bag 11 would not exert a rebounding force to both automobiles 10 and 12 in the collision. The openings 13 are positioned in such a way as to afford maximum aerodynamic breaking depending on the size and weight of the automobile 10. The front surface of the front compartment 11E is ruffled with a plurality of depressions 14 so as to provide a maximum drag to the automobile 10 upon the bag's inflation. The bag 11 may additionally be weighted such that it would stay close to the ground upon its inflation to ensure that it would not rise above the automobiles 10 and 12. The bag 11 is made of a fire retardant material to eliminate its contribution to the fire hazard to the automobiles in collision and it would act as a blanket to extinguish the fire if a fire occurs. Furthermore, the bag 11 may be made of a transparent material so that the vision of the operators of the automobiles 10 and 12 would not be blocked by the inflated bag.

Figure 2:
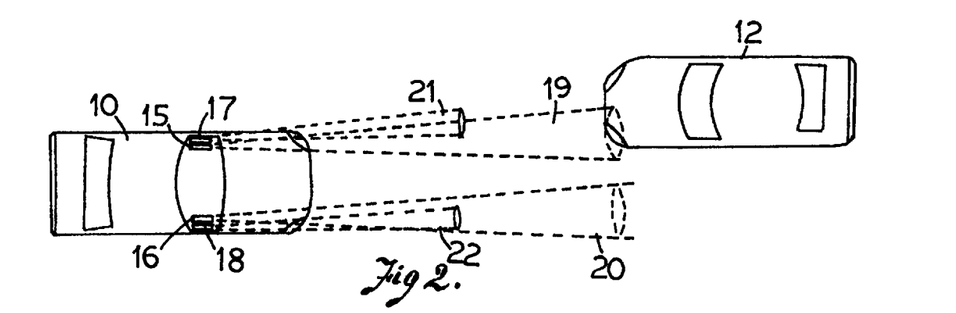
FIG. 2 is a top elevation view showing the mounting of sensors on an automobile for detecting the speed of an approaching automobile for selectively providing a warning signal to the driver of the danger of a collision or to deploy the safety air bag automatically when collision with the other automobile.

Sensors 15, 16, 17 and 18 are provided in the automobile 10 to determine the approaching speed of the oncoming automobile 12 for the actuation of the air bag 11 when a collision is imminent. The sensors 15 and 16 detect the speed of the oncoming automobile entering the border of the dangerous distance for actuating an alarm circuit to provide an early warning signal to the driver of the automobile 10. An alarm sound signal together and/or flashing warning light will be actuated to indicate the danger. At this stage, the driver of automobile 10 has the time to decide whether to take suitable evasive action such as turning away from the collision course, or to deploy the inflatable air bag 11 immediately. Sensors 17 and 18 provides the final detection of the imminent collision for deploying the inflatable air bag 11 automatically immediately.

As best shown in FIG. 2 the sensors 15 and 17 are mounted on the left side on the dashboard of the automobile 10 while the sensors 16 and 18 are mounted on the right side thereof The early warning sensors 15 and 16 detect the light source emitted by the oncoming automobile in relatively longer sensing conical areas 19 and 20, while the final warning sensors 17 and 18 detect the light source emitted by the oncoming automobile in the relatively shorter sensing conical areas 21 and 22.

Figure 3:
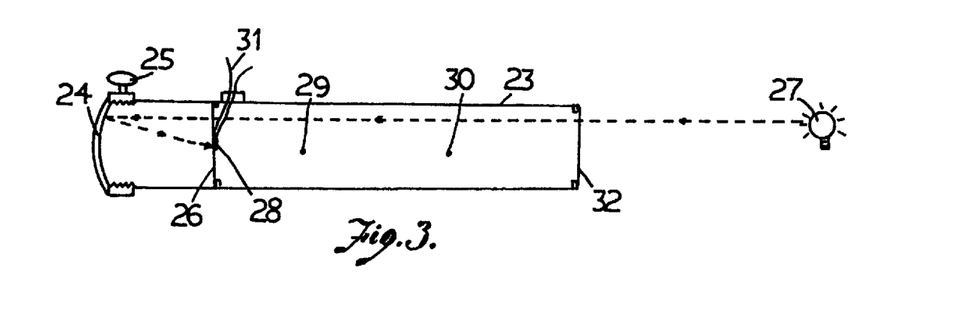
FIG. 3 is a side elevation view showing the construction of the sensor.

The sensors 15 through 18 are generally constructed as best shown in FIG. 3. Each sensor has an elongated housing 23 with a concave reflective mirror 24 adjustably mounted at its rear end with a threaded mounting ring. The mounting ring is fixedly secured to the housing 23 by a set screw 25. The position of the reflective mirror 24 may be adjusted by loosening the set screw 25 and turning the mounting ring to move the mirror 24 back or forth to a selected position and then tightening the set screw 25 to secure it in place. A transparent disc 26 is fixedly mounted in the housing 23 at the focus of the reflective mirror 24 at which a brightest image of an object reflected from the mirror 24 is located. The object is schematically indicated by a light source 27. A light image transducer 28 is mounted at the center of the transparent disc 26. The reflective mirror 24 has a focal point 29, and the point 30 is the center of curvature of the mirror 24. The focal point 29 is located at approximately halfway between the mirror 24 and its center of curvature 30. The position of the reflective mirror 24 is preadjusted such that the light source 27 at a predetermined distance would have the brightest image at the center of the transparent disc 26 at which the light image transducer 28 is located. The predetermined distance is the farthest point of the dangerous distance at which the oncoming automobile is located away from the automobile 10. An electrical signal generated by the light image transducer 28 is sent to the electronic warning circuit by lead wires 31 to provide the warning alarm signal or to deploy the air bag 11 automatically. A light filter 32 is provided at the front end of the sensor. The light filter 32 reduces any ambient light interference in order to obtain a clear light image of the headlight or taillight of the oncoming automobile in the sensor. Since all automobiles nowadays are provided with daylight running headlights and will also soon be provided with all time running taillights, the sensors of the present invention are effective for detecting the possibility of a collision with an approaching vehicle without the use of harmful laser lights as in the prior art devices.

The relationship between the component parts of the sensor and the distance to the oncoming automobile is expressed by the following formula:

$$1/d + 1/q = 2/r$$

in which d is the distance between the reflective mirror to the oncoming automobile;

q is the distance between the transparent disc and the reflective mirror; and r is the distance between the reflective mirror and its center point of curvature.

Figure 4:
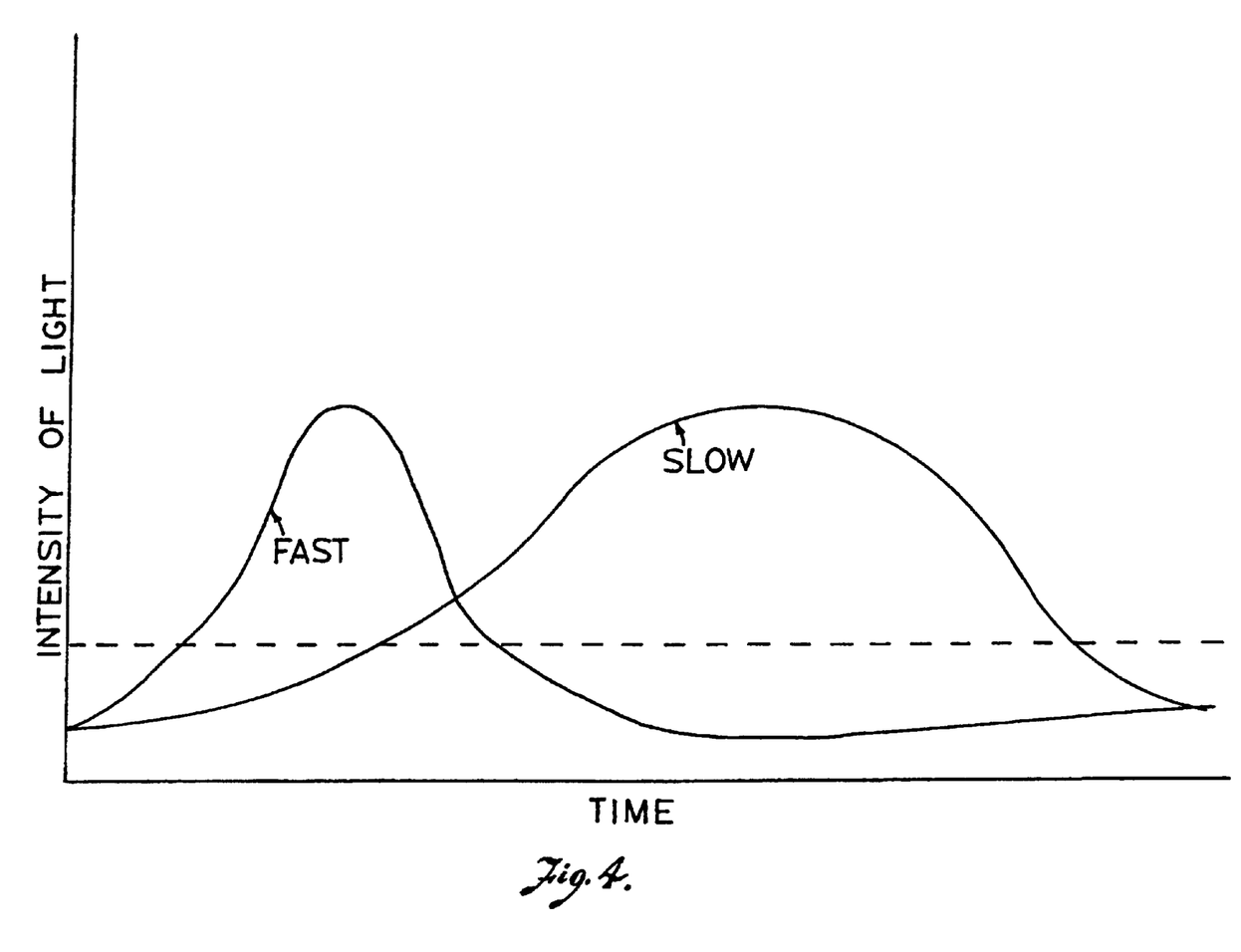
FIG. 4 is a graph showing the intensity of light of the image of an object appearing at the transducer in sensor.

The intensity of the light image of the headlight or taillight of the oncoming automobile versus its speed or time as detected by the sensors is best shown in the graph of FIG. 4 in which the curve FAST indicates the approaching speed of the other automobile being fast, and the curve SLOW indicates the approaching speed of the other automobile being slow. When the approaching automobile is beyond the farthest point of the dangerous distance the intensity of the image is low. The intensity peaks when the other automobile is at the predetermined farthest point, and the intensity again diminishes as the other automobile approaching closer. The voltage output of the light transducer 28 is amplified and the amplified signal is sampled at a very high rate. Each of the sample is addressed by the time in nanoseconds or microseconds and the sampled output voltage is converted to a digital value by an analog to digital converter. The digital value may be stored in a memory of a microcomputer. When the stored digital value of any sample is greater than a predetermined value representing the peak value generated by the image of the colliding object. This peak value is selected as well as the value which is lower by a fixed level of approximately 70% both before and after the peak value. The time difference between these two lower levels is a measure of the speed of the approaching automobile.

Figure 5:
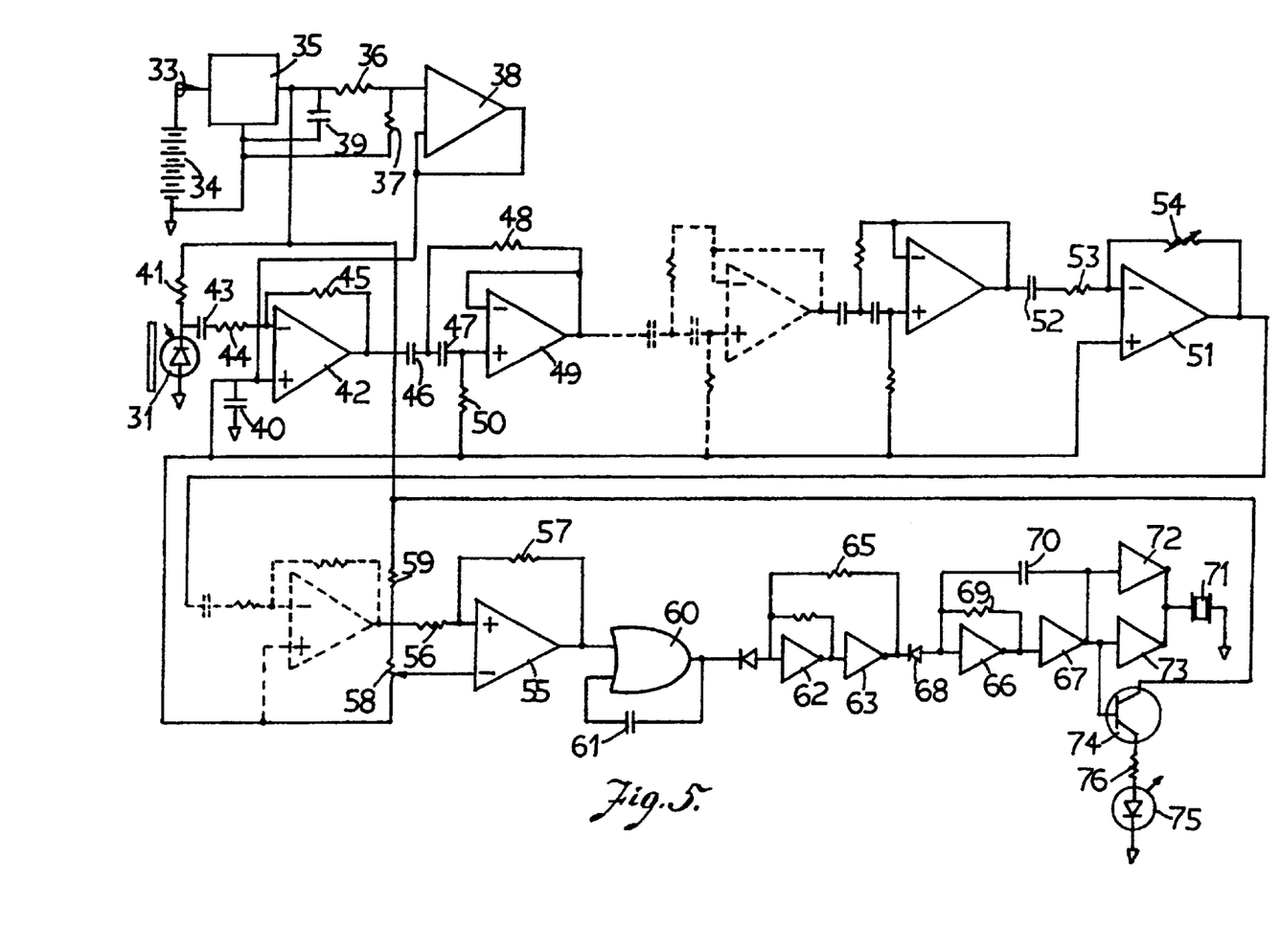
FIG. 5 is an exemplary electrical circuit coupled to the transducer for selective providing the warning signal to the driver of the automobile of an impending collision, or deploying the safety air bag automatically when collision is imminent.

FIG. 5 shows an exemplary electrical circuit operative for determing the speed of the approaching automobile. The circuit is actuated when the ignition switch 33 of the automobile 10 is switched on so that the voltage from the battery 34 is applied to a regulator 35. The output of the regulator 35 is divided by the resistors 36 and 37 together with an op-amp 38 to provide an output middle voltage for operating subsequent op-amps. The output voltage of the regulator 35 is connected to the common ground through a capacitor 39 while the output middle voltage of the op-amp 38 is also connected to the common ground through a capacitor 40. A resistor 41 is connected in series to the light transducer 31 which may be in form of a photo diode which generates an output electrical signal relative to the light intensity of the light image of the oncoming automobile in the sensors 15 through 18. When the photo diode 31 is illuminated by the light from the oncoming automobile as represented by the light 27 in FIG. 3, the output electrical signal of the photo diode 31 goes higher. Thus, when the rate of rise and fall of the light on the photo diode 31 is higher, it would indicate a faster approaching object. The output electrical signal thus generated is amplified by an second op amp 42 by connecting to the negative input terminal of the latter through a series connected capacitor 43 and resistor 44. A feedback resistor 45 controls the gain of the output signal of the op amp 42. The output middle voltage of the op amp 38 is connected to the positive input terminal of the second op amp 42 to operate the latter. The output of the second op amp 42 is then passed through a plurality of high pass filters, and since an alarm is required at specific high speed, any signal corresponding to the lower speed can be virtually eliminated. Each high pass filter consists of a capacitor 46 connected directly to receive the output voltage from the second op amp 42 and to direct the same to the junction between a capacitor 47 and a resistor 48. The other end of the resistor 48 is connected to the output terminal of an op amp 49. The other end of the capacitor 47 is connected to the positive input terminal of the op amp 49 and also to a resistor 50. The other end of the resistor 50 is connected to the output middle voltage of the op amp 38. The output of the op amp 49 is connected to its negative input terminal. The values of these components are chosen to provide a very sharp cut off of the frequency. A plurality of such high pass filter may be provided as shown by the dotted lines. These high pass filters have a nominal gain of unity thus further amplification may be required for their output. The amplification is provided by a plurality of amplifiers which may have a similar construction. The negative input terminal of the first stage amplifier 51 is connected to the output of the high pass filters through series connected capacitor 52 and resistor 53. A potentiometer 54 provides the feedback resistance to the amplifier 51. The positive input terminal of the amplifier 51 is connected to the output middle voltage of the op amp 38. The subsequent similar amplifiers are shown in dotted lines. After the amplification, the amplified output voltage is further applied to the positive input terminal of a amplifier 55 via a resistor 56. The amplifier 55 serves as a Schmidt trigger. The ratio of the positive feedback resistor 57 and the resistor 56 determines the hysteresis of the Schmidt trigger. The switching voltage of the Schmidt trigger can be set by the voltage on the negative input terminal of the amplifier 55 by adjusting a potentiometer 58 which derives its voltage from the output voltage of the regulator 35 via a resistor 59. The output of the Schmidt trigger is applied to a CMOS OR circuit 60. As soon as the high speed is detected, there is an output of high voltage signal at the output of the amplifier 55 which goes high resulting the output of the OR circuit 60 to go high. The output of the OR circuit 60 remains high until it is discharged by a capacitor 61 and resistor 62 to the ground. The discharging period is chosen to be longer enough to allow sufficient time for the operator of the automobile 10 to respond to the warning signal of the approaching automobile or object at a high speed so that the operator may either take evasive action to change its course to avoid the collision or to deploy the inflatable air bag 11 immediately. As long as the output voltage of the OR circuit 60 is high, it would activate a first oscillator comprising of two invertors 62 and 63 of a hex invertor CMOS and the resistor 64 and the timing capacitor 65. When the output voltage from the OR circuit 60 is low, the diode conducts and inhibits the oscillator. A second oscillator consisting of two series connected CMOS hex invertors 66 and 67 is caused to oscillate by a diode 68 when the output voltage from the first oscillator is high. A resistor 69 and a capacitor 70 connected to the second oscillator are chosen to have a higher period so as to enable the generation of a beeping warning alarm signal by a buzzer 71. The output of the second oscillator is applied to the buzzer 71 through two invertors 72 and 73 connected in parallel and serving as a buffer. The buzzer 71 may be provided by a piezoelectric crystal. In order to also provide an alarm warning light, a transistor 74 is connected to the output of the second oscillator. The transistor 74 turns on a high efficiency light emitting diode 75 via a resistor 76 to provide a flashing warning light signal.

Figure 6:
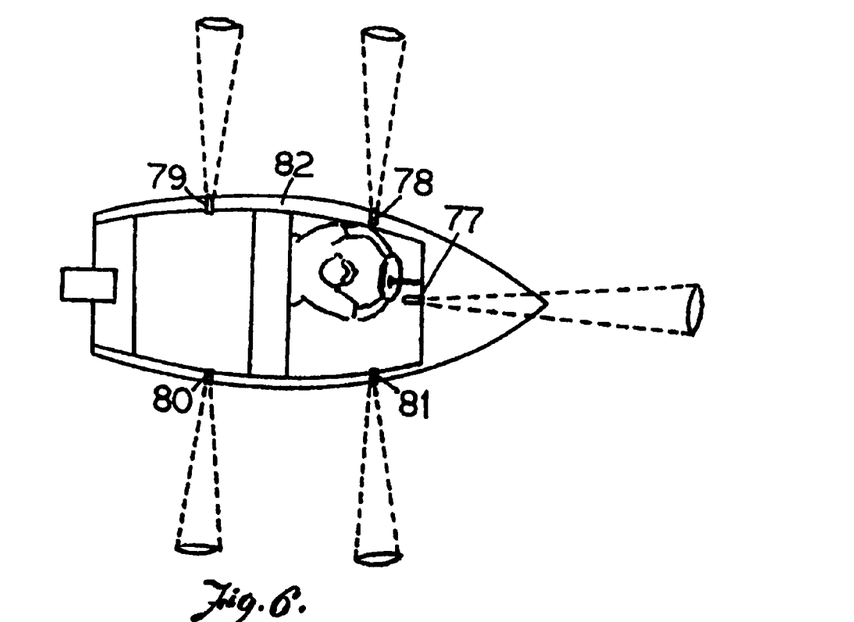
FIG. 6 is a top elevation view of the provision of a plurality of sensors on a boat for detecting potential collision of the boat with other objects.
Figure 7:
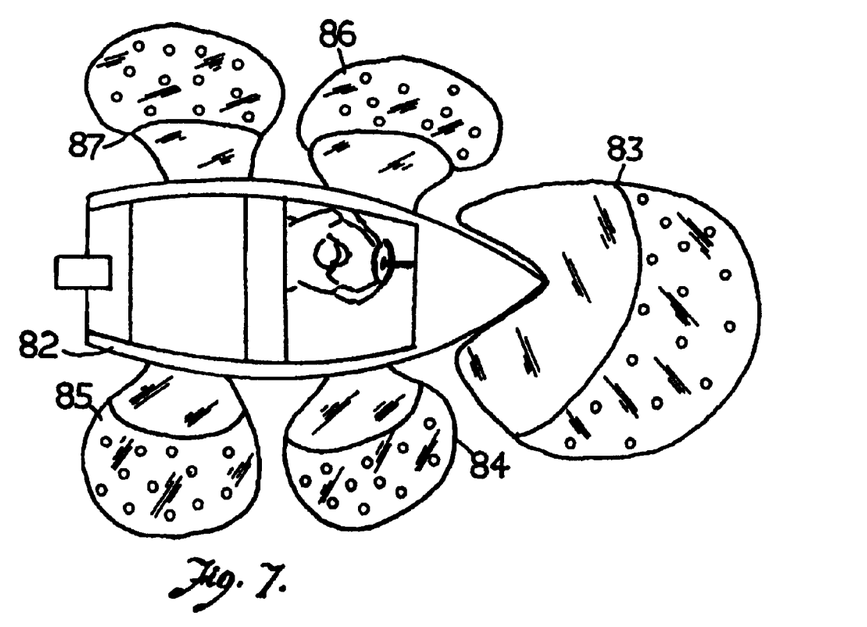
FIG. 7 is a top elevation view showing the location of the safety inflatable air bags on the boat.
Figure 8:
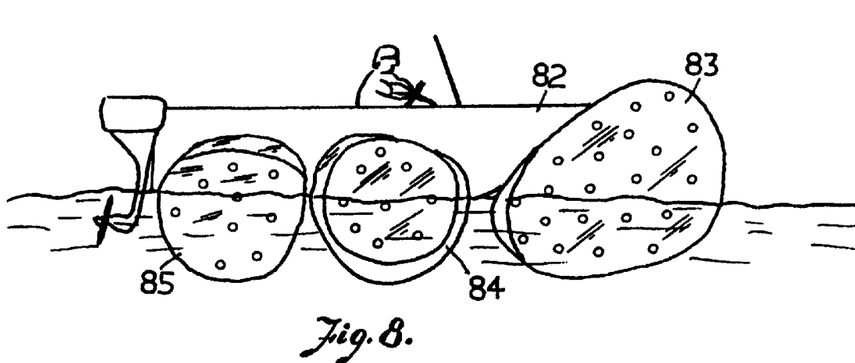
FIG. 8 is a side elevation view of FIG. 7.

The sensors of the present invention may also be provided on a water craft for detecting any danger of its collision with other objects or other water crafts. As shown in FIG. 6, five sensors 77, 78, 79, 80 and 81 are provided one at the bow and two at both the starboard and port sides of the water craft 82. The bow sensor 77 would activate a front double compartment inflatable air bag 83 upon detecting the approach of a colliding object therewith. The side sensors 80 and 81 on the starboard side would activate the double compartment inflatable air bags 84 and 85 respectively on the starboard side of the water craft, while the side sensors 78 and 79 would activate the double compartment inflatable air bags 86 and 87 located on the port side of the water craft. The double compartment inflatable air bags 83 through 87 are similar to air bag 11 for the automobile 10 except with the portion having openings therein located at the front therein so as to eliminate bounce upon impact. The front surface of the inflatable air bags 83 through 87 are all ruffled to provide aerodynamic breaking, and they are located on a horizontal line between the center of gravity and the center of buoyancy of the water craft 82 such that they would not topple the water craft 82 upon their deployment. They will provide an instant braking as well as shift of the direction of motion of the water craft when selected ones of them are deployed to avoid collision or for the purpose of emergency navigation.

Figure 9:
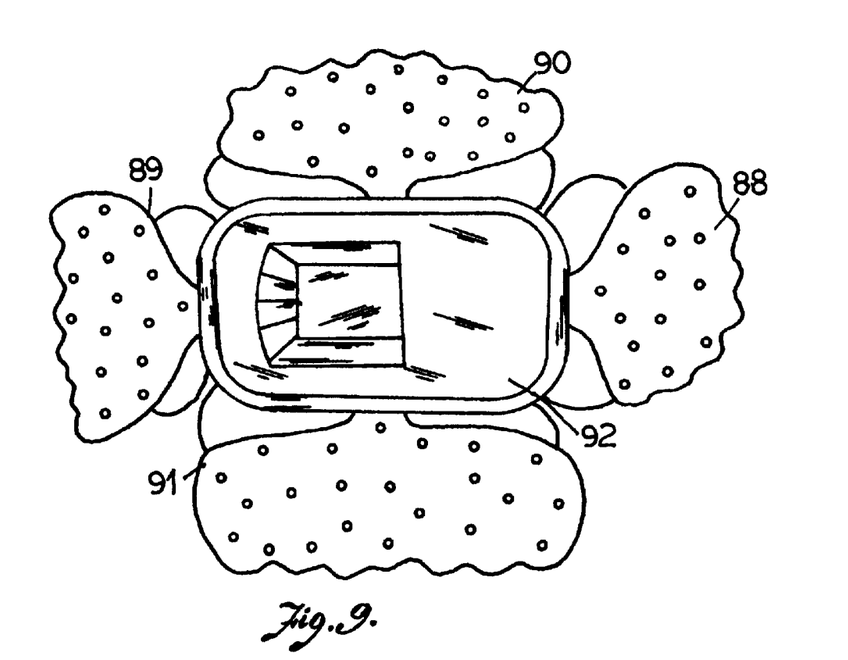
FIG. 9 is a top elevation view showing the provision of safety inflatable air bag on a hovercraft.

Similarly, double compartment safety inflatable air bags 88, 89, 90 and 91 may be deployed on the four sides of a hovercraft 92 for the same purposes as best shown in FIG. 9.

Figure 10:
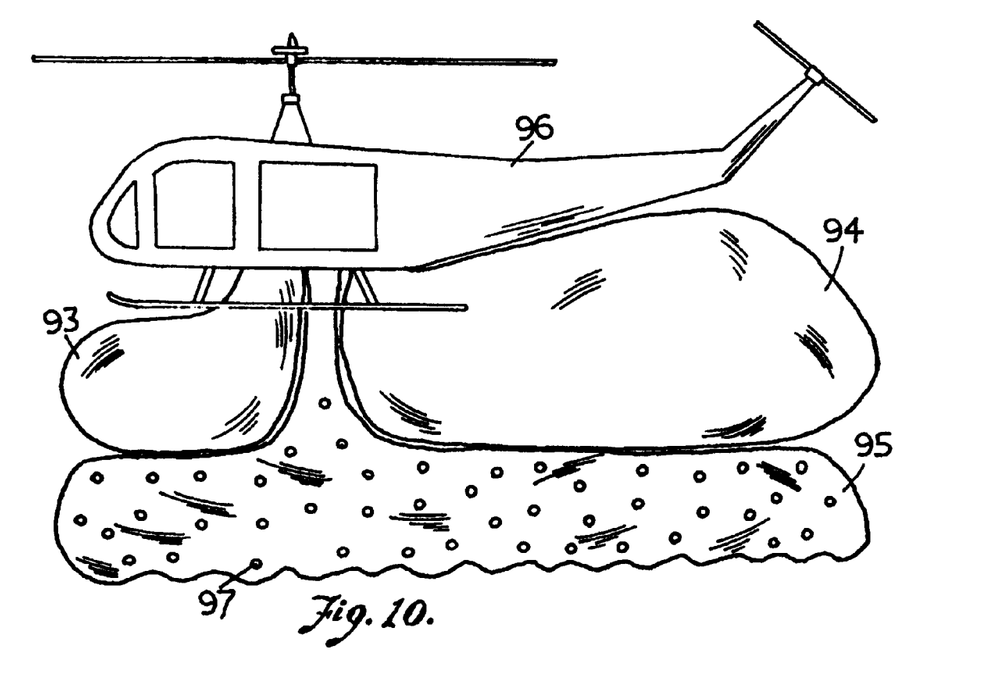
FIG. 10 is a side elevation view showing the provision of safety inflatable air bag on a helicopter according to the present invention.

As shown in FIG. 10, similar safety inflatable air bags 93, 94 and 95 may be provided at the underside of a helicopter 96. The openings 97 formed in the outer air bag 95 provide the aerodynamic breaking as well as reducing the bounce when the helicopter crashes onto the ground. The large inner air bags 93 and 94 provide the required buoyancy to maintain the helicopter afloat when it falls into water. The air bags are deployed manually by the pilot, since for a helicopter there is a sufficient time to deploy the air bags before it falls to the ground or water.

Figure 11:
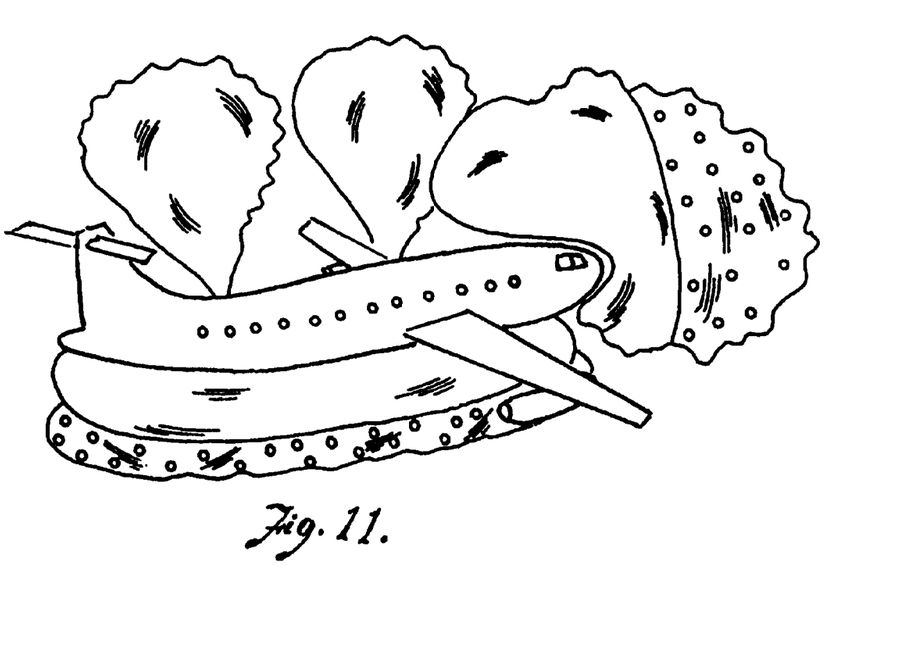
FIG. 11 is a perspective side elevation view showing the provision of external safety inflatable air bags on an air plane according to the present invention.
Figure 12:
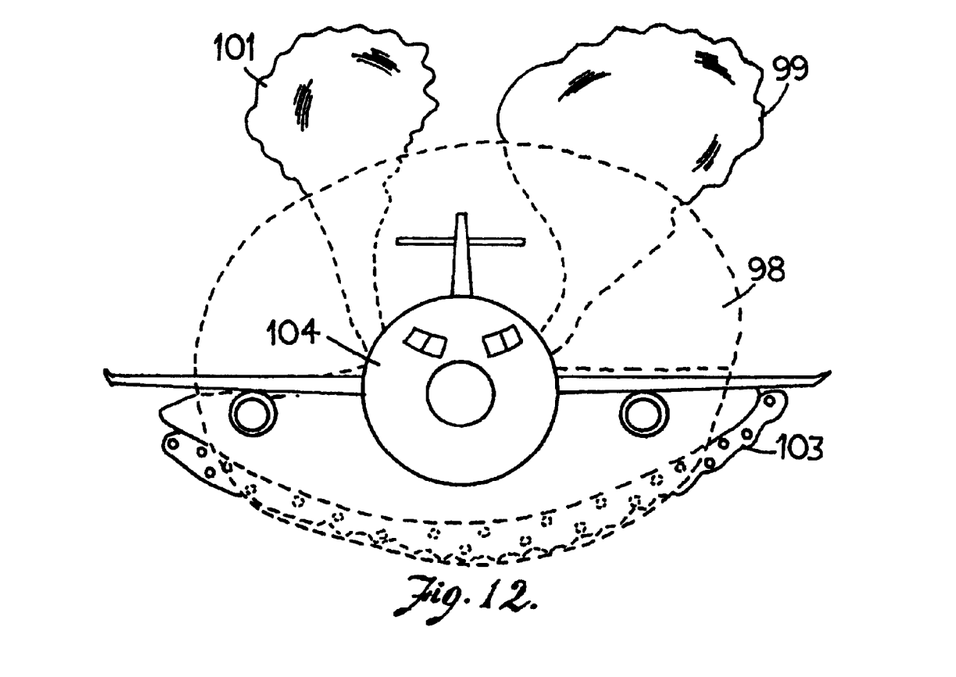
FIG. 12 is a front elevation view of FIG. 11.
Figure 13:
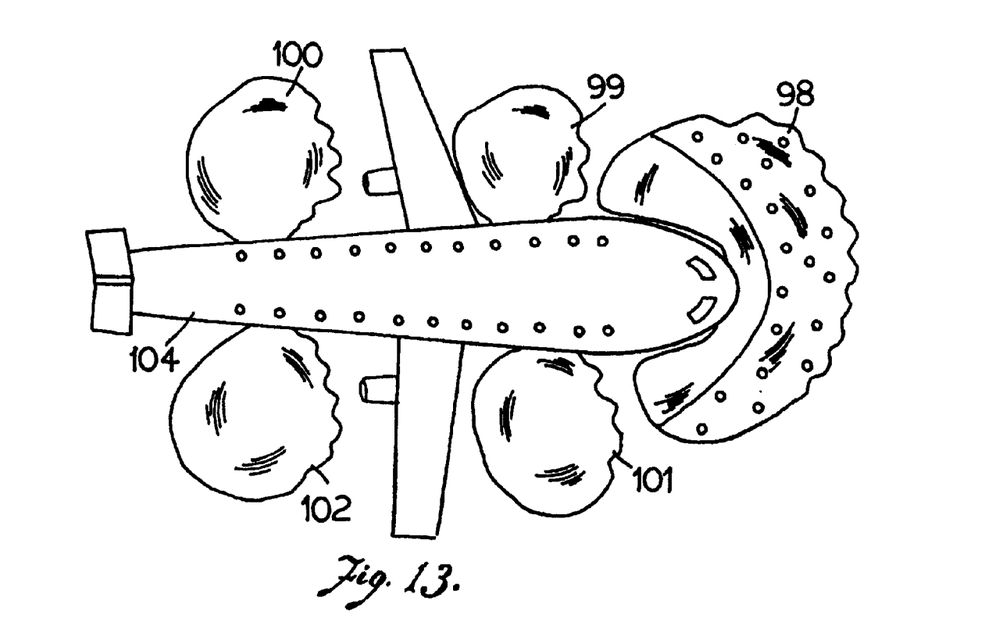
FIG. 13 is a top elevation view of FIG. 11.

A plurality of inflatable air bags 98, 99, 100, 101 102 and 103 may be provided on an air plane 104 for the same purposes. Similar to that for a helicopter, the air bags may be deployed manually by the pilot. The air bag 98 located at the front end of the air plane 104 substantially wraps over the entire front end to reduce its destruction when the air plane crashes head on against a mountain side. The air bags 99 through 102 located on the two sides of the air plane 104 act as parachutes to slow down the speed of descend as well as a dragging means to reduce the forward motion of the air plane. The double compartment air bag 103 at the underside of the air plane 104 also reduces the speed descend of the air plane. It provides the cushioning means to absorb the impact when the air plane crashes onto the ground, and it also provides the floating means to maintain the air plane afloat when it falls onto water until rescue arrives. The air bags are so positioned so that they exert very low stress to the structure of the air plane upon their deployment.

Figure 14:
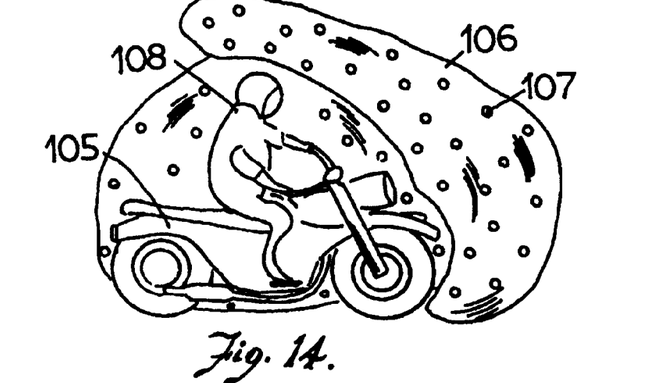
FIG. 14 is a side elevation view showing the provision of the external safety inflatable air bag for a motorcycle according to the present invention.
Figure 15:
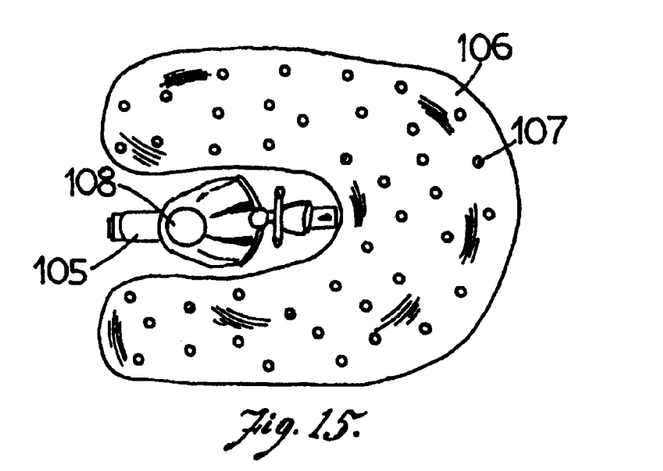
FIG. 15 is a top elevation view of FIG. 14.

The safety air bag system of the present invention may be provided on a motorcycle 105 as best shown in FIGS. 14 and 15. A single large air bag 106 having a plurality of pressure release openings 107 may be provided. The air bag 106 also has a wrap around shape upon its deployment so that it extends entirely over the top, front and two sides of the motorcycle 105 to provide full protection of the rider 108 and any passenger thereon. Sensors similar to those for an automobile may be provided to deploy the air bag 106 automatically.

Figure 16:
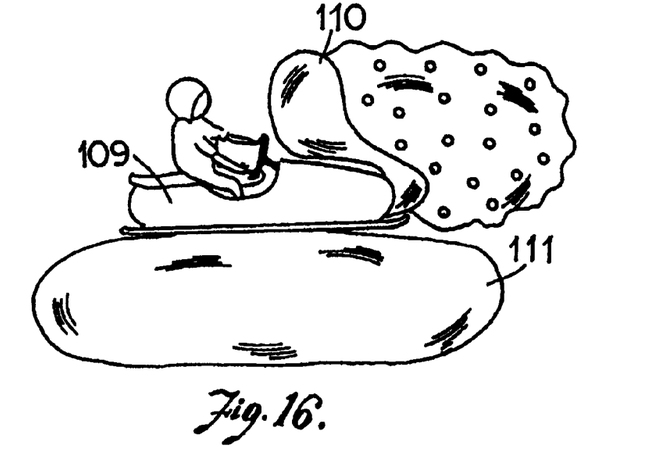
FIG. 16 is a perspective side elevation view showing the provision of external safety inflatable air bags for a snowmobile according to the present invention.

Similar safety air bag system may be provided on a snowmobile 109 as shown in FIG. 16. The front air bag 110 may be a double compartment air bag or a single air bag with a plurality of air releasing openings as for the motorcycle. An additional, air bag may be provided at the underside of the snowmobile 109 to provide the floating means to maintain it afloat when the snowmobile 109 falls into water.

Although preferred embodiments of the present invention have been described here in detail, those skilled in the art will recognize that various substitutions and modifications which may be made to the specific structures and methods of fabrication without departing from the scope and spirit of the invention as recited in the appended claims.

What is claimed is:

1. An external safety inflatable air bag system for a conveyance, deployable in a collision accident, comprising,
    at least one inflatable air bag adapted on said conveyance and having a substantially large size comparing to physical size of said conveyance, upon deployment,
    a plurality of aerodynamic breaking openings formed in said inflatable air bag for reducing rebounce of said conveyance when impacting upon said air bag during said an accident,
    said air bag having a rough front surface.

2. An external safety inflatable air bag system according to claim 1 wherein said rough front surface includes a plurality of ruffles formed therein adapted to squelch aerodynamic air flow over said air bag for slowing forward motion of said conveyance, and said air bag being made of a transparent material.

3. An external safety inflatable air bag system according to claim 2 wherein said air bag includes a second portion without openings formed therein.

4. An external safety inflatable air bag system according to claim 3 including at least one speed sensor means mounted on said conveyance and adapted to detect the speed of an object moving towards said conveyance and adapted selectively to provide a warning signal indicating potential danger of said conveyance in colliding with said object, and to deploy said air bag automatically when collision with said object is imminent.

5. An external safety inflatable air bag system according to claim 4 said sensor means comprising an elongated tube having a concave reflective mirror mounted at a rear end therein, said mirror being adjustable and adapted to provide a light image of said object at a predetermined location within said tube corresponding to a selected distance of said object from said conveyance, and a light filter mounted at a front end therein, said light filter being adapted to reduce ambient light entering into said tube.

6. An external safety inflatable air bag system according to claim 5 including a transparent disc mounted at said predetermined location within said tube, a transducer means mounted on said disc and adapted to generate an electrical signal responding to said light image.

7. An external safety inflatable air bag system according to claim 6 including an electrical circuit means coupled to said transducer means and adapted selectively to generate said warning signal and to deploy said air bag automatically when collision with said object is imminent.

8. An external safety inflatable air bag system according to claim 7 wherein said conveyance is an automobile and said air bag includes a front top portion extending forwardly adapted to cover over said object impacting on said front surface and said object is a second automobile and said air bag includes a front lower portion extending forwardly adapted to slide under a front end of said second automobile.

9. An external safety inflatable air bag system according to claim 7 wherein said conveyance is a water craft, and a front inflatable air bag being provided at a bow portion of said water craft, and two side inflatable air bags being provided at both sides of said water craft.

10. An external safety inflatable air bag system according to claim 9 including a separate sensor means for said front inflatable air bag and each one of said side inflatable air bags.

11. An external safety inflatable air bag system according to claim 10 including a rear inflatable air bag adapted at a stern portion of said water craft, and an additional sensor means mounted at said stern portion adapted for deploying said rear inflatable air bag when said stern portion collides with another object.

12. An external safety inflatable air bag system according to claim 3 wherein said conveyance is a helicopter and said inflatable air bag being adapted at an underside of said helicopter.

13. An external safety inflatable air bag system according to claim 12 wherein said inflatable air bag has a relatively large physical size and adapted to maintain said helicopter afloat when said helicopter falls into a body of water.

14. An external safety inflatable air bag system according to claim 3 wherein said conveyance is an air plane, and said inflatable air bag including a front inflatable air bag adapted at a front end of said air plane, a lower inflatable air bag adapted to deploy over the entire underside of said air plane, and a plurality of side inflatable air bags adapted at both sides of said air plane.

15. An external safety inflatable air bag system according to claim 14 wherein said front inflatable air bag has a substantially large physical size upon deployment and adapted to wrap over the entire front end of said front end of said air plane.

16. An external safety inflatable air bag system according to claim 15 wherein said side inflatable air bags are adapted to act as parachutes for supporting descend of said air plane when said air plane is falling to ground in an accident.

17. An external safety inflatable air bag system according to claim 16 wherein said lower inflatable air bag includes a relatively large portion adapted to maintain said air plane afloat when said air plane falls onto a body of water.

18. An external safety inflatable air bag system according to claim 3 wherein said conveyance is a motorcycle, and said air bag, upon deployment, includes a top portion covering over said motorcycle and a rider located thereon, and two side portions covering over both sides of said motorcycle.

19. An external safety inflatable air bag system according to claim 3 wherein said conveyance is a snowmobile, and said at least one air bag including a front air bag deployable over a front end of said snowmobile and a lower air bag deployable over the entire underside of said snowmobile.

20. An external safety inflatable air bag system according to claim 19 wherein said lower air bag is adaptable for maintaining said snowmobile afloat in a body of water when said snowmobile falls into said body of water.

\* \* \* \* \*